(12) United States Patent
Plaščinskas

(10) Patent No.: US 11,655,101 B2
(45) Date of Patent: May 23, 2023

(54) STORAGE SYSTEM

(71) Applicant: DEMATIC LIMITED, Banbury (GB)

(72) Inventor: Mantas Plaščinskas, Kauno r. sav. (LT)

(73) Assignee: Dematic Limited, Adderbury (GB)

( * ) Notice: Subject to any disclaimer, the term of this patent is extended or adjusted under 35 U.S.C. 154(b) by 102 days.

(21) Appl. No.: 17/154,857

(22) Filed: Jan. 21, 2021

(65) Prior Publication Data
US 2021/0229915 A1    Jul. 29, 2021

(30) Foreign Application Priority Data

Jan. 24, 2020  (EP) ................................ 20153707

(51) Int. Cl.
*B65G 1/06* (2006.01)
*B65G 47/244* (2006.01)

(52) U.S. Cl.
CPC ............. *B65G 1/06* (2013.01); *B65G 47/244* (2013.01)

(58) Field of Classification Search
CPC ................................ B65G 47/244; B65G 1/06
See application file for complete search history.

(56) References Cited

U.S. PATENT DOCUMENTS

2006/0285948 A1* 12/2006 Tsujimoto ............... B65G 1/06
  414/279
2018/0208397 A1*  7/2018 Schack ............... B65G 1/0492

FOREIGN PATENT DOCUMENTS

| DE | 202004007004 U1 | 7/2004 |
| EP | 0733563 A1 | 9/1996 |
| EP | 2923971 A1 | 9/2015 |
| EP | 2979996 A1 | 2/2016 |
| EP | 2591559 B1 | 8/2016 |
| EP | 2741977 B1 | 9/2016 |
| EP | 2794431 B1 | 5/2017 |
| GB | 2313818 A | 12/1997 |

OTHER PUBLICATIONS

European Search Report for priority European Application No. EP20153703.

* cited by examiner

*Primary Examiner* — Saul Rodriguez
*Assistant Examiner* — Willie W Berry, Jr.
(74) *Attorney, Agent, or Firm* — Gardner, Linn, Burkhart & Ondersma LLP

(57) ABSTRACT

A rack storage system with at least two multi-level longitudinally extending storage racks separated by an aisle, and at least two load lifting devices for storage units. Guide tracks run in at least some of the rack levels along the aisle for storage and retrieval vehicles that transport storage units between the storage racks and load lifting devices, with the guide tracks arranged to extend along the aisle and past the load lifting devices to enable access to the storage racks and each load lifting device. The load lifting devices are arranged in a row in a longitudinal direction of a storage rack either within the storage rack itself or in an extension of the longitudinal extension of a storage rack and a conveyor is connected to the intermediate load lifting device by circumventing at least one lifting device by using free space of an adjacent aisle.

20 Claims, 18 Drawing Sheets

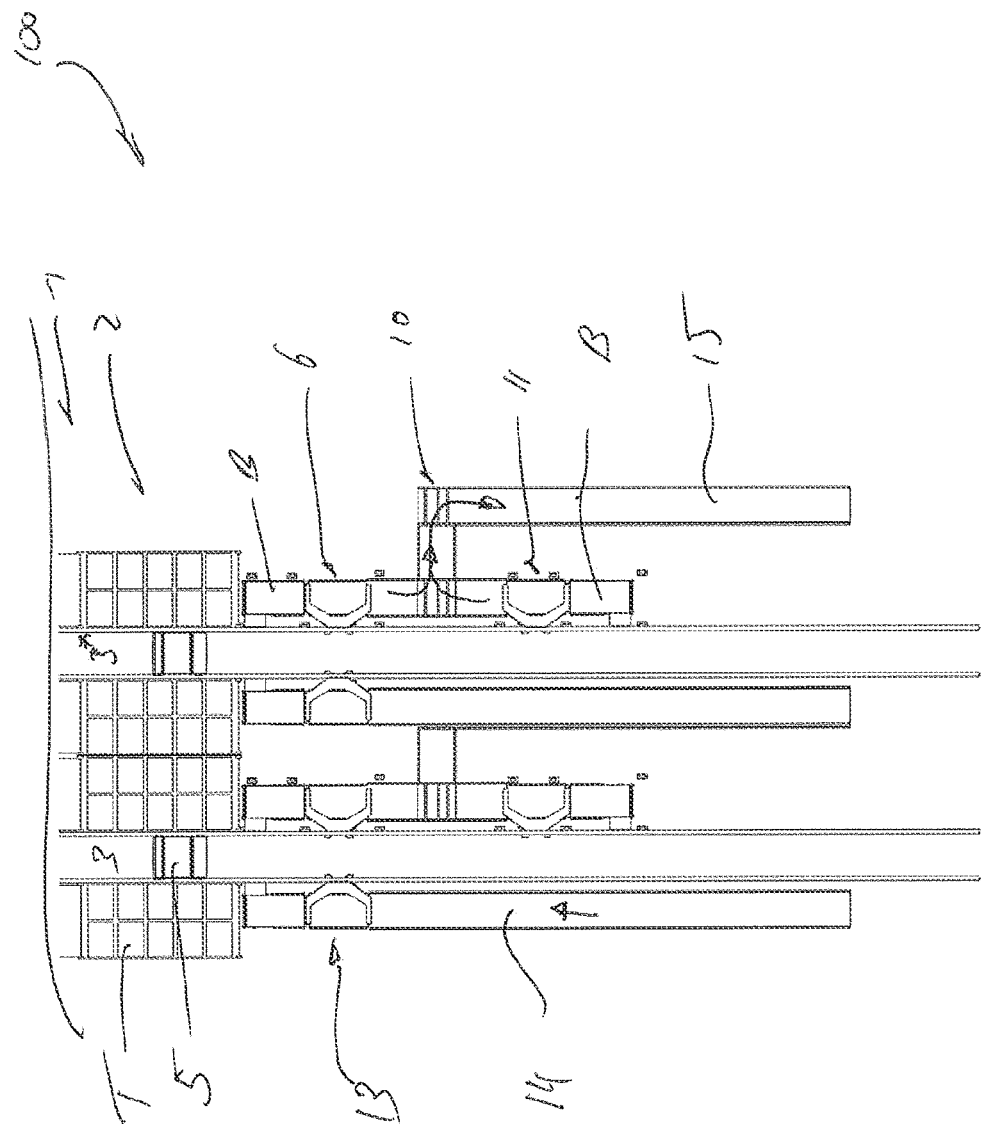

STORAGE SYSTEM

CROSS REFERENCE TO RELATED APPLICATION

The present application claims priority of European application number EP20153707.3, filed on Jan. 24, 2020.

BACKGROUND AND FIELD OF THE INVENTION

The present invention relates to a storage system having multi-level longitudinally extending storage racks, load lifting devices for lifting or lowering storage units, and storage and retrieval vehicles that are displaceable along guide tracks for transporting the storage units between the storage racks and the load lifting devices in the corresponding rack levels.

It is known to store goods in containers in multi-level racks with aisles between, in which automatic storage and retrieval machines (ASRS) travel for storage and discharge of the goods. The automatic storage and retrieval machines exchange goods on the different levels with vertical lifts which are connected to an inbound/outbound service level.

For example, EP 2 794 431 B1 to TGW discloses a rack storage system having storage racks for goods and a goods manipulator unit which unit comprises at least one first goods lifting device with a transport device and a first buffer device with supply conveyors. The rack storage system also comprises a rack aisle and trackways running in the longitudinal direction of the rack aisle at the rack levels, and single-level storage and retrieval units for transporting goods and a conveyor system connected to the goods lifting device for transporting goods to and from the goods lifting device. The buffer device comprises at the rack levels a first buffer zone section and a second buffer zone section, in which the supply conveyors are arranged, and between which the transport device of the goods lifting device can be positioned and driven in such a manner that simultaneously first goods can be conveyed from the first buffer zone section onto the transport device and second goods can be conveyed from the transport device onto the second buffer zone section.

SUMMARY OF THE INVENTION

The present invention provides a respective storage system that permits increased throughput by adding more lifting devices.

In accordance with an aspect of the invention, a storage system includes at least two load lifting devices arranged in a row in a longitudinal direction of a storage rack either within the storage rack itself or in an extension of the longitudinal extension of a storage rack at the same front end of the storage and at least one conveyor is connected to the intermediate (between the front most and rack) load lifting device by circumventing the most front end arranged load lifting device by using free space of an adjacent aisle, whereby it is possible to access both lifts with a conveyor. The free space present in the area of the lifts can be used three-dimensionally by arranging the conveyor for connection to the lifts either horizontally in the same level or vertically above or below in different levels. The free space is present as in the area neighboring the lifting devices no (or few) storage spaces are present. Thus in accordance with a particular aspect of the present invention, at least one of the load lifting devices is circumvented by using free space of an adjacent aisle so as to allow conveyor connection from the side to an elevator to which a straight conveyor connection at that level is not plausible.

In a particular embodiment, the at least two load lifting devices are arranged in a row in a longitudinal direction of a storage rack either within the storage rack itself or in extension of the longitudinal extension of a storage rack at the same front end of the storage and, that is, at least one conveyor may be connected to a first one of the load lifting devices by circumventing the other one of the load lifting devices, wherein the load lifting device further from the racking is circumvented by using free space of an adjacent aisle so as to access the load lifting device closest to the racking.

Embodiments of the invention thus provide a modular racking system that allows multiple lifts that are in line to be connected at the same end of the aisle to be accessible by one or more conveyors, for either infeed or outfeed of articles/storage containers etc., even though the lift between the rack and the outermost lift is essentially blocked for access by a straight conveyor connection by the outermost lift or any further respective lifts. Thus, a solution for connecting as many lifts as necessary located in a single row in a modular manner is provided.

The use of at least two load lifting devices is also beneficial in that these lifts are usually the bottleneck in comparison to, for example, the storage and retrieval vehicles.

In a particular embodiment the load lifting devices each have a liftable and lowerable transport platform for lifting or lowering storage units in a linear vertical fashion. Still further, each load lifting device will usually span the full height of the storage rack, i.e. vertically extend over all levels. The transport platform will usually be able to transport at least one article or case or load carrying aid (tray, container, tote etc.). However, it is also possible to have the transport platform be constructed to carry two or more articles or load carrying aids at the same time.

In particular embodiments the transport platform may also include a conveyor of to support pick up or drop off of the respective articles or load carrying aids, where the conveyor may be of various configurations. As the load lifting devices are integrated into the footprint of the rack the guide tracks easily pass them and allow access to either side of the load lifting devices by the storage and retrieval vehicles.

In a particular embodiment each load lifting device is dedicated to infeed or outfeed of articles or load carrying aids into or from the storage rack. In other words, it will not be used for both functions as in EP 2 794 431 B1. Therefore, the conveyor of the load lifting transport platforms will not need to be controlled in a reversible manner. It is however possible, when using (connecting) conveyors running in between levels, for example as per FIG. 16 below, to arrange buffer conveyors on the same side as connecting conveyor, thus enabling lift reversing in order to outfeed to buffer conveyors, or vice versa—from buffer to connecting conveyor.

In accordance with a further aspect of the present invention, the guide tracks are arranged to allow the storage and retrieval vehicles access to all of the storage rack and the load lifting vehicles and possibly the buffers, i.e. runs the length of the complete arrangement.

The storage and retrieval vehicles may be single-level servicing shuttles or multiple-level servicing shuttles, i.e. a shuttle would be able to access two or more levels, usually not more than 5 levels. Moreover, depending on the style of shuttle, the guide tracks are only present in the corresponding levels. It is also possible to use standard ASRS machines (mini loads) as automatic storage and retrieval vehicles which include single level and multilevel rack serving units.

The storage and retrieval vehicles include a load handling area which is serviced by load handling devices usually in the form of telescopic arms that are extendable to both sides of the aisle and include multiple fingers that can be swiveled between an engaging horizontal or slanted orientation and an upright or vertical non-engaging orientation, each to contact the article or load for pushing/pulling it. The telescopic arms usually have double deep or higher working range.

The respective guide tracks do not only provide a running surface for the storage and retrieval vehicles but also may provide energy transfer, for example electricity transfer via collectors, and/or control and information signal transfers, such as for example transfer via collectors, signals being modulated onto the current.

In a particular embodiment the system may be controlled by a central control using a warehouse management system (WMS) that integrates control of the devices and fulfillment of orders by interacting with an order fulfillment control system. Both systems may be implemented by dedicated control hardware or as a software hosted by local and/or cloud-hosted servers.

In one embodiment the least two load lifting devices are connected to the same conveyor. This allows for a disentangled connection to the storage rack. In an alternative embodiment the least two load lifting devices are connected to separate conveyors and the separate conveyors are arranged on same or different levels, which allows for extremely high throughput.

In yet another embodiment a further load lifting device having a liftable and lowerable transport platform for lifting or lowering storage units is arranged in extension of the longitudinal extension of the opposite side of the aisle of the storage rack at the same front end of the storage being connected to a separate conveyor, preferably having a straight conveying path. This allows the further load lifting device for example to be a dedicated infeed load lifting device which can be easily accessed. The other at least two load lifting devices would then be dedicated outfeed devices.

In a particular embodiment the at least two load lifting devices of adjacent aisles share the same conveyor. This allows for beneficial use of the available space and allows to connect both aisles using only one conveyor. Such an arrangement is especially useful when the storage racks of both aisles are at least double deep storage racks that provide enough space horizontally for the arrangement of the conveyor. In such an arrangement it is preferred that the at least two load lifting devices are present on both sides of each aisle.

To increase performance of the storage and retrieval vehicles and to decouple them from the operation of the load lifting devices, the buffer conveyors may be arranged on one side or both sides of a load lifting device in at least some rack levels in which guide tracks are present. In one particular variation of this embodiment, each load lifting device only has a buffer conveyor on one side and the buffer conveyor has a dedicated direction of conveyance, namely being either infeed or outfeed to or from the load lifting device.

As the storage and retrieval vehicles may include load handling devices that allow for direct exchange of load carrying aids or articles between aisles by pushing these within the storage rack into positions more than normal deep storage using the load handling means of the storage and retrieval vehicles themselves (see EP 2 741 977 A1), it is possible that buffer conveyors of corresponding load lifting devices of neighboring aisles or of corresponding load lifting devices used for same transport direction are arranged on alternating levels only. This reduces the complexity of the technical construction.

In yet another embodiment the at least two load lifting devices present on same side (transverse side) of an aisle are for either storage/infeed and/or discharge/outfeed transport direction purposes of articles/load carrying aids.

It is possible to use storage units of same size throughout the whole system. However, in view of such storage units always needing the same space irrespective of item size, it may be beneficial to use different sizes of storage units, for example full and half-size storage units. In which case the at least one conveyor has an integrated article rearrangement path with a vertically extendable pin for rearranging storage units from a longitudinal aligned conveying to a sideways aligned conveying by contacting a leading-edge while being conveyed. This allows the system to rearrange the storage units (for example trays or containers) for either double deep storage for full-size or quadruple deep storage for half-size storage units. The use of such different kind of size of storage units within the system also allows the storage and retrieval vehicles for example to carry two half-size storage units at the same time, further increasing throughput.

Still further, it is also possible to arrange storage locations in areas not used by the load lifting devices, for example on a side of the aisle opposite to the at least two load lifting devices. In this manner, even though the lifts are arranged on one side of the tracks, the other side is not lost but used for storage space.

At least two load lifting devices may be used to access different storage racks, i.e. can be arranged between two storage racks essentially bridging these and providing infeed and/or outfeed to both storage racks using only one load lofting device arrangement. In extension of this idea, it is also possible to have load lifting devices at both ends of an aisle or both front ends of a storage rack. If this is the case, the load lifting devices nearest to the rack may be connected by a conveyor running in an empty level, i.e. connecting both front ends.

Still further, the outbound or outfeed directed conveyors may be connected to routing conveyors, to picking stations, sorters and so on. The inbound or infeed directed conveyors may be sourced from a high bay pallet storage with a depalletization, a sorter or even directly from a goods intake area. Further features and details of the invention will be apparent from the description hereinafter in connection with the drawings.

BRIEF DESCRIPTION OF THE DRAWINGS

FIG. 18 shows a variation of FIG. 2, where multiple load lifting devices share circumventing conveyors.

DESCRIPTION OF THE PREFERRED EMBODIMENTS

Figure 1:
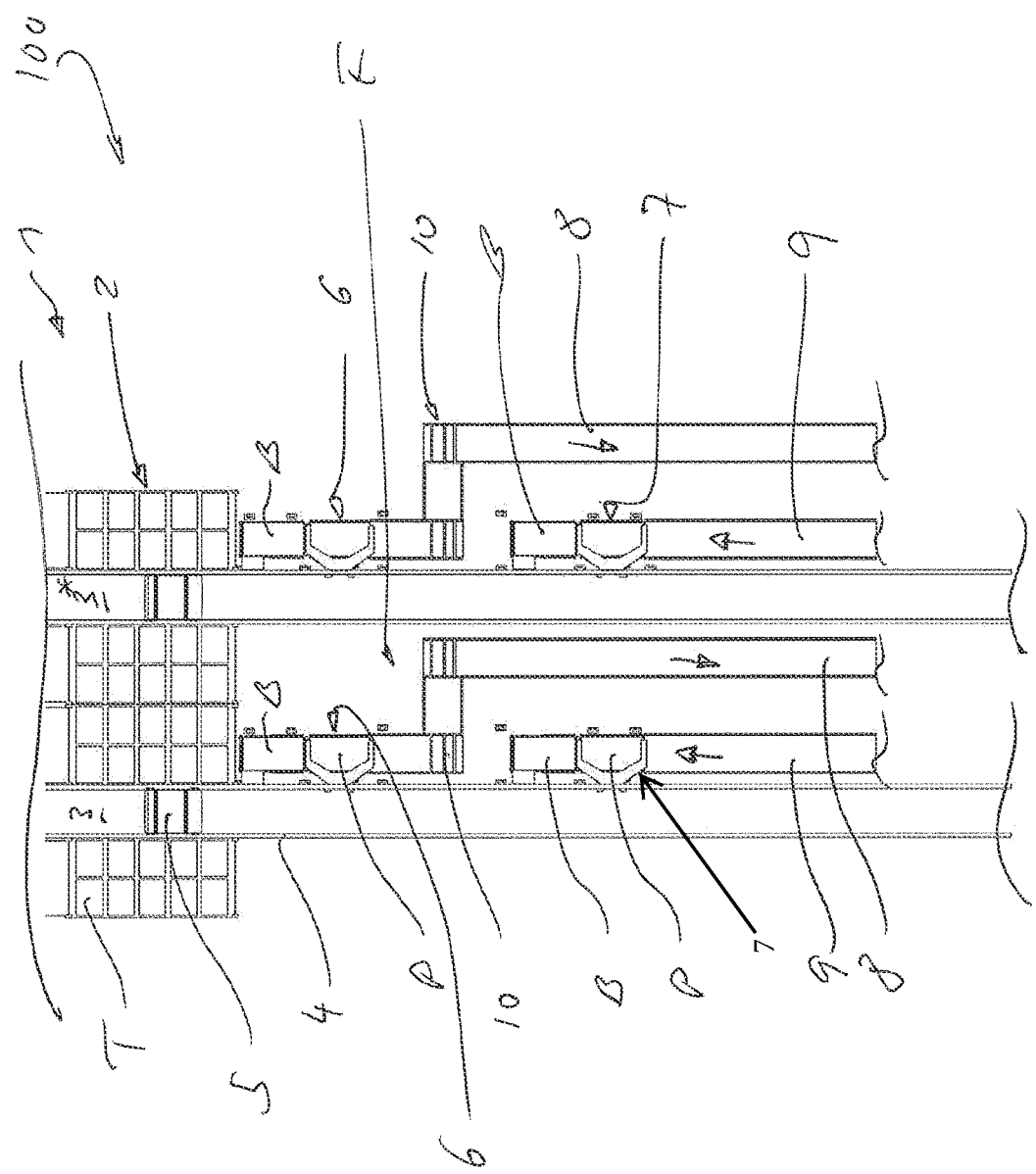
FIG. 1 shows a top view of a first embodiment of a storage having two load lifting devices with separate conveyors on the same level.

In FIG. 1 a first embodiment of a rack storage system referenced as 100 is shown. It comprises a storage 1 with at least two multi-level longitudinally extending storage racks 2 that are laterally separated by an aisle 3. In the figure only two such aisles 3 with corresponding double deep storage racks 2 are detailed, even though it is understood that multiple such racks and aisle may be present. In each level guide tracks 4 for storage and retrieval vehicles, which in the illustrated embodiment are configured as shuttles extend the length of the aisle 3 and past at least two load lifting devices 6, 7 each having a liftable and lowerable transport platform P for lifting or lowering storage units T, which are trays in the present embodiment. The guide tracks 4 are arranged in each such level in a way that the shuttles 5 may fully access the storage racks 2 and each load lifting device 6, 7 by arranging the guide tracks 4 to extend along the aisle 3 and past the load lifting devices 6, 7. The shuttles 5 are designed to transfer the trays between the storage locations in the storage racks 2 and the load lifting devices 6, 7.

To decouple this exchange buffer conveyors B are arranged on one side of each load lifting device 6, 7. The other side of each load lifting device 6, 7 is connected to a conveyor 8, 9 for transporting storage units to and from said load lifting devices 6, 7 (see arrows). The conveyor 8 is connected to the load lifting device 6 so that both are used for outfeed or discharge of trays from the storage 1 and conveyor 9 is connected to load lifting device 7 so that both are used for infeed or storage of trays into the storage 1. The two load lifting devices 6, 7 are arranged in a row in extension of the longitudinal extension of the storage rack 2 at the same front end of the storage.

As conveyor 8 is connected to the "intermediate" load lifting device 6 it needs to circumventing the most front end arranged load lifting device 7 by using free space F of an adjacent aisle, which in the present embodiment is done by the zig-zig or Z-form form of the conveyor 8 using the space created by the adjacent double deep storage locations between respective aisles 3 and 3*. Conveyor 8 in the present embodiment uses two right angle transfers 10 (RAT) to achieve the circumvention around the load lifting device 7. Both conveyors 8, 9 are separate conveyors but on the same level. Conveyor 9 leads straight into load lifting device 7.

Figure 2:
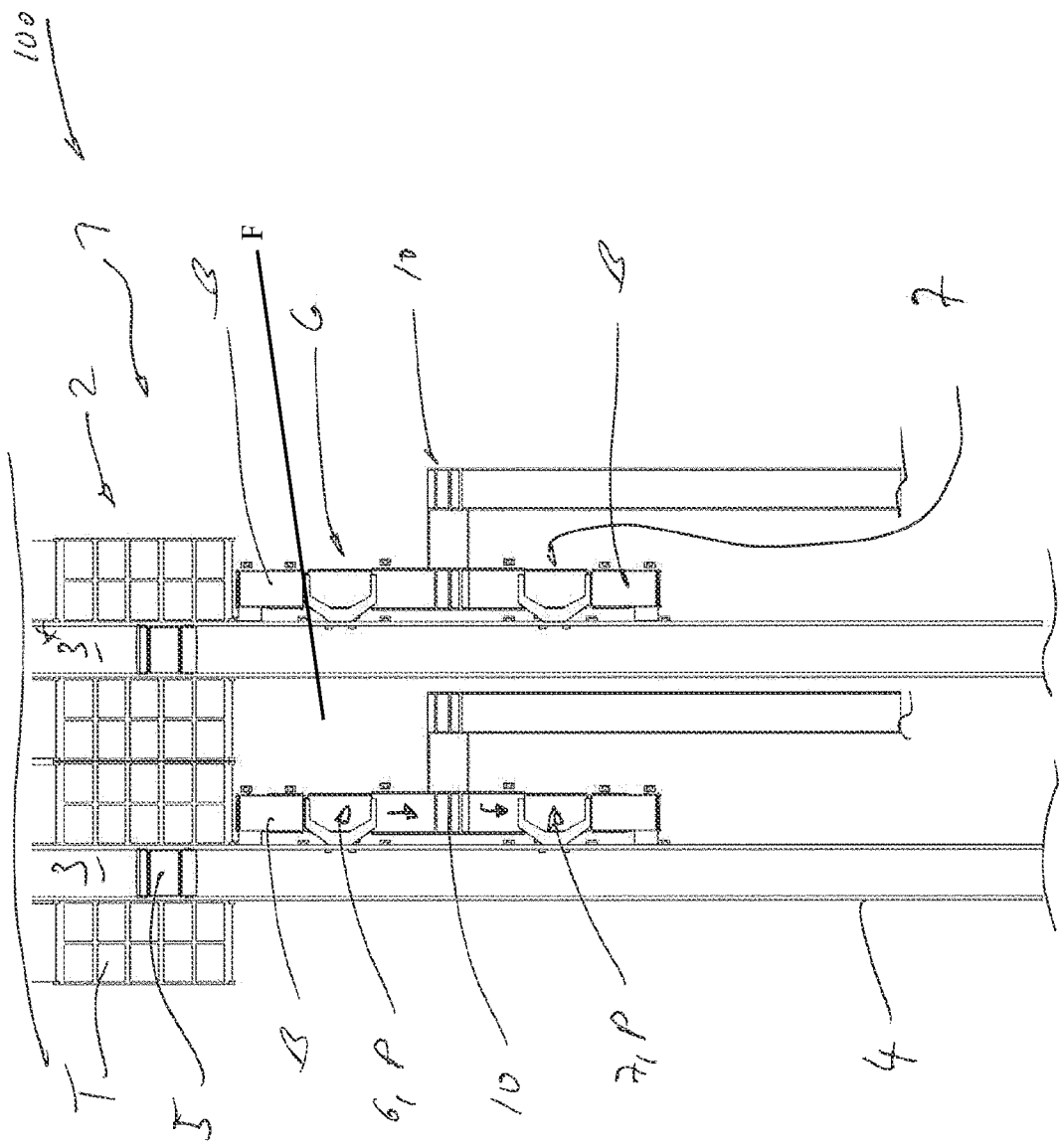
FIG. 2 shows a top view of a second embodiment of a storage having two load lifting devices with separate conveyors on different levels.
Figure 3:
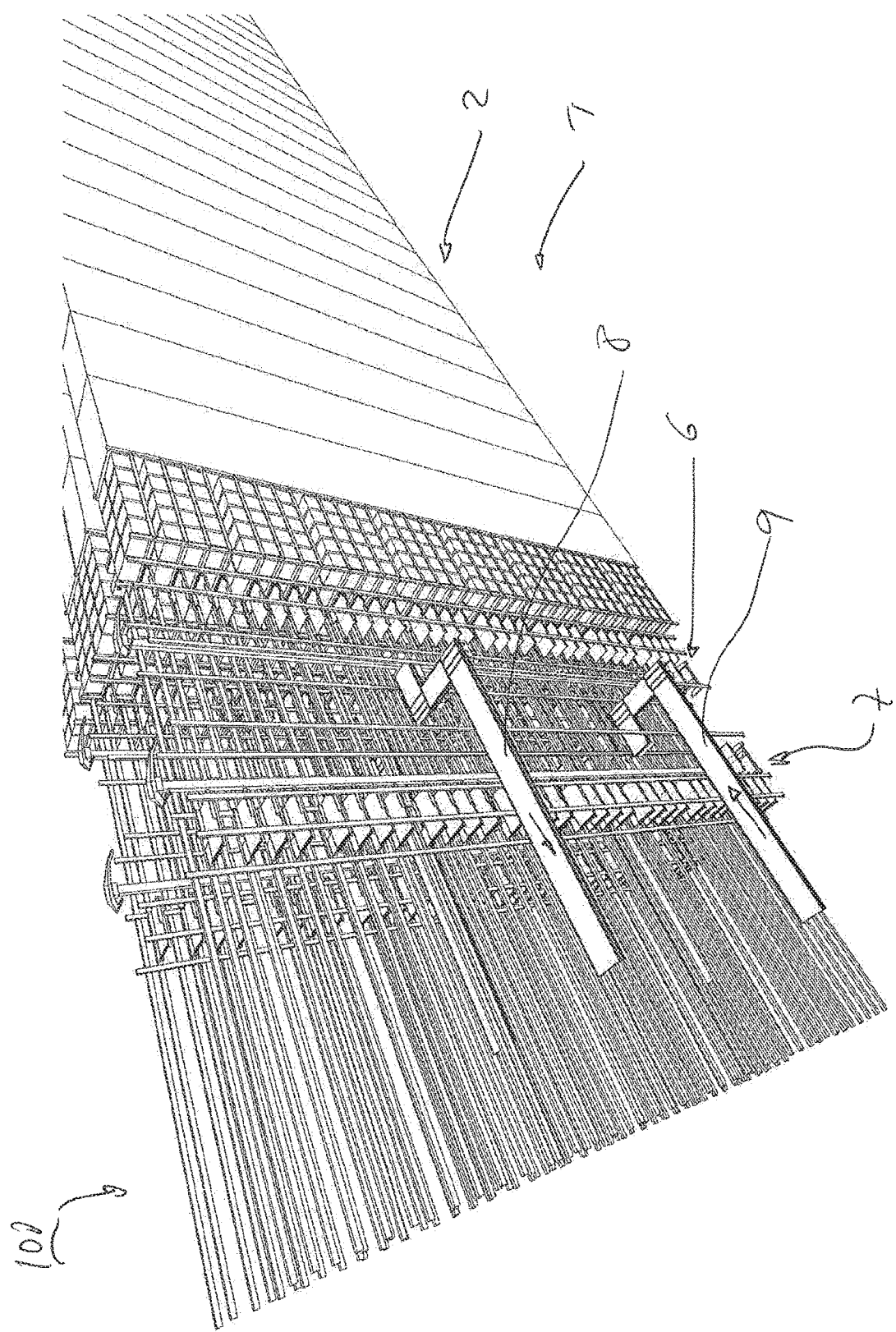
FIG. 3 shows a perspective view on the embodiment of FIG. 2.
Figure 4:
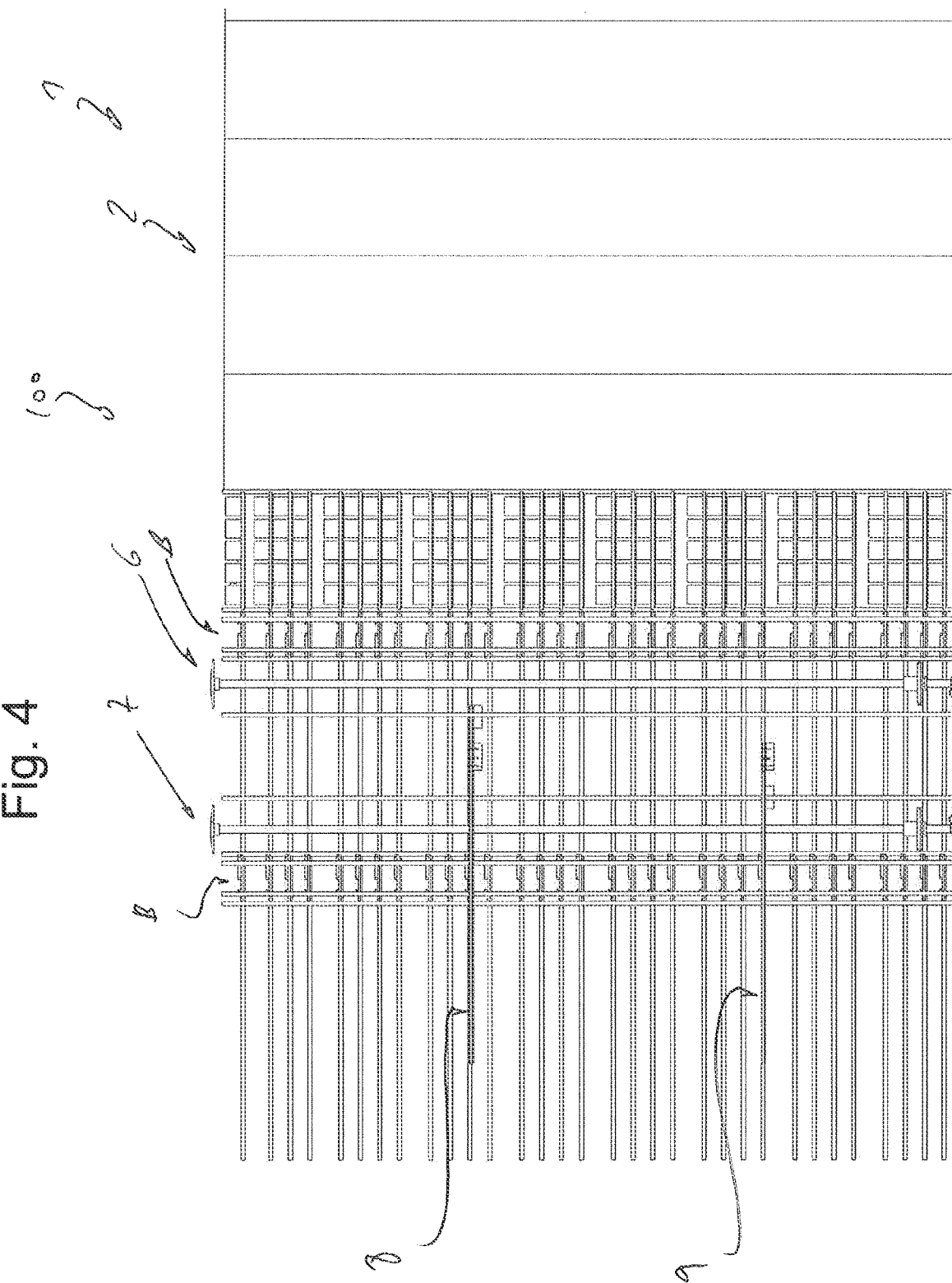
FIG. 4 shows a side view on the embodiment of FIG. 2.

In contrast herewith, the embodiment of FIGS. 2 to 4 has essentially the same configuration of the overall system with the difference that load lifting devices 6, 7 have separate conveyors 8, 9 that are arranged on different levels as can be seen in FIGS. 3 and 4. A further difference is that conveyor 9 is connected to the load lifting device 7 on the side facing the load lifting device 6 so that the conveyor 9 also needs to circumvent the load lifting device 7 using RAT's 10 (see FIG. 3). This allows to extend the system by adding a further load lifting device 11 with a buffer B and conveyor 12 connecting to the device as detailed in FIGS. 5 and 6, so as to essentially provide a storage 1 having three load lifting devices 6, 7, 11 with separate conveyors 8, 9, 12 each on different levels (see FIG. 6). Conveyors 8 and 12 are outbound and conveyor 9 inbound. The directions of the conveyors can (in general) be controlled to be the other way around. In this modular fashion the system can be extended as needed to increase throughput.

Figure 5:
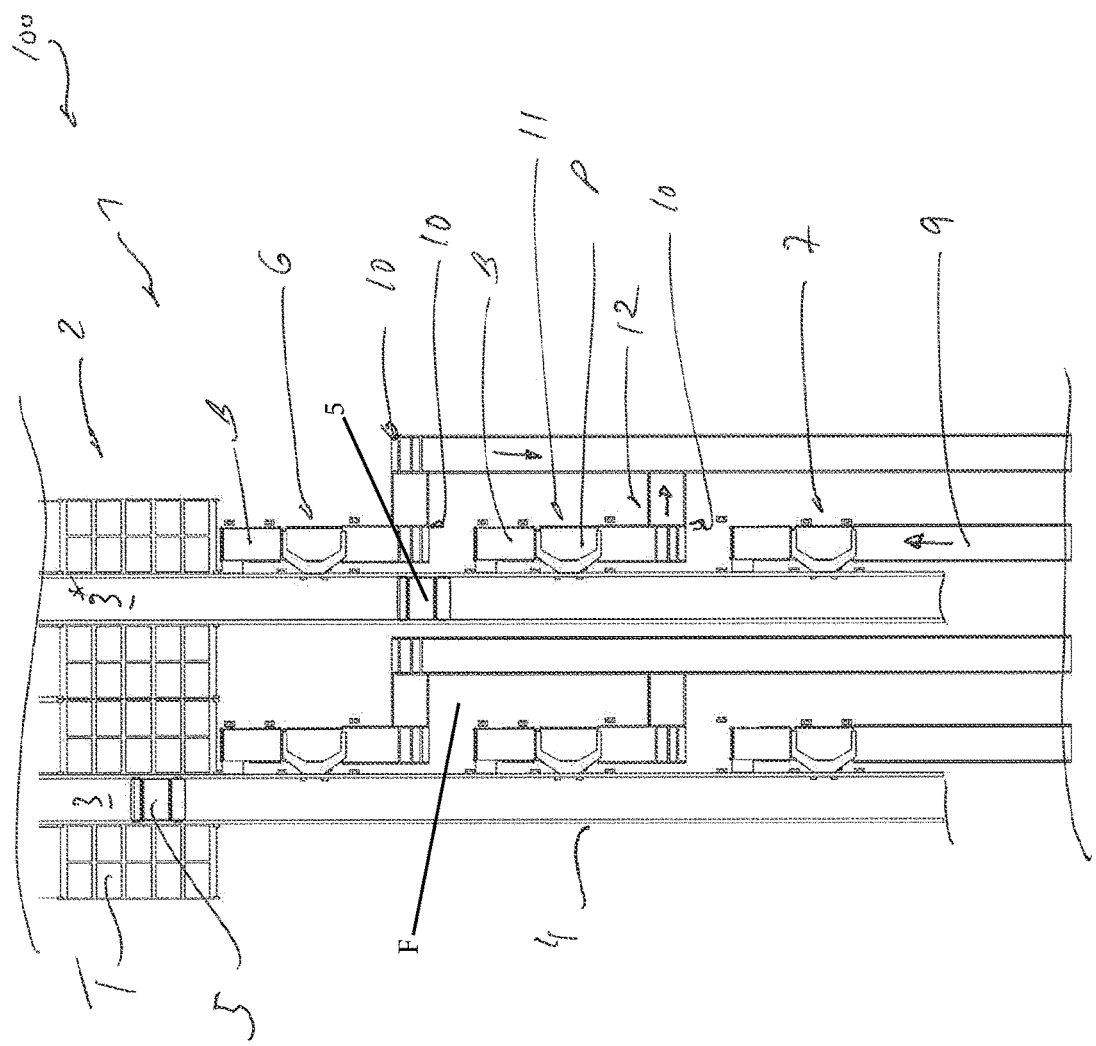
FIG. 5 shows a top view of a third embodiment of a storage having three load lifting devices with separate conveyors on different levels.
Figure 6:
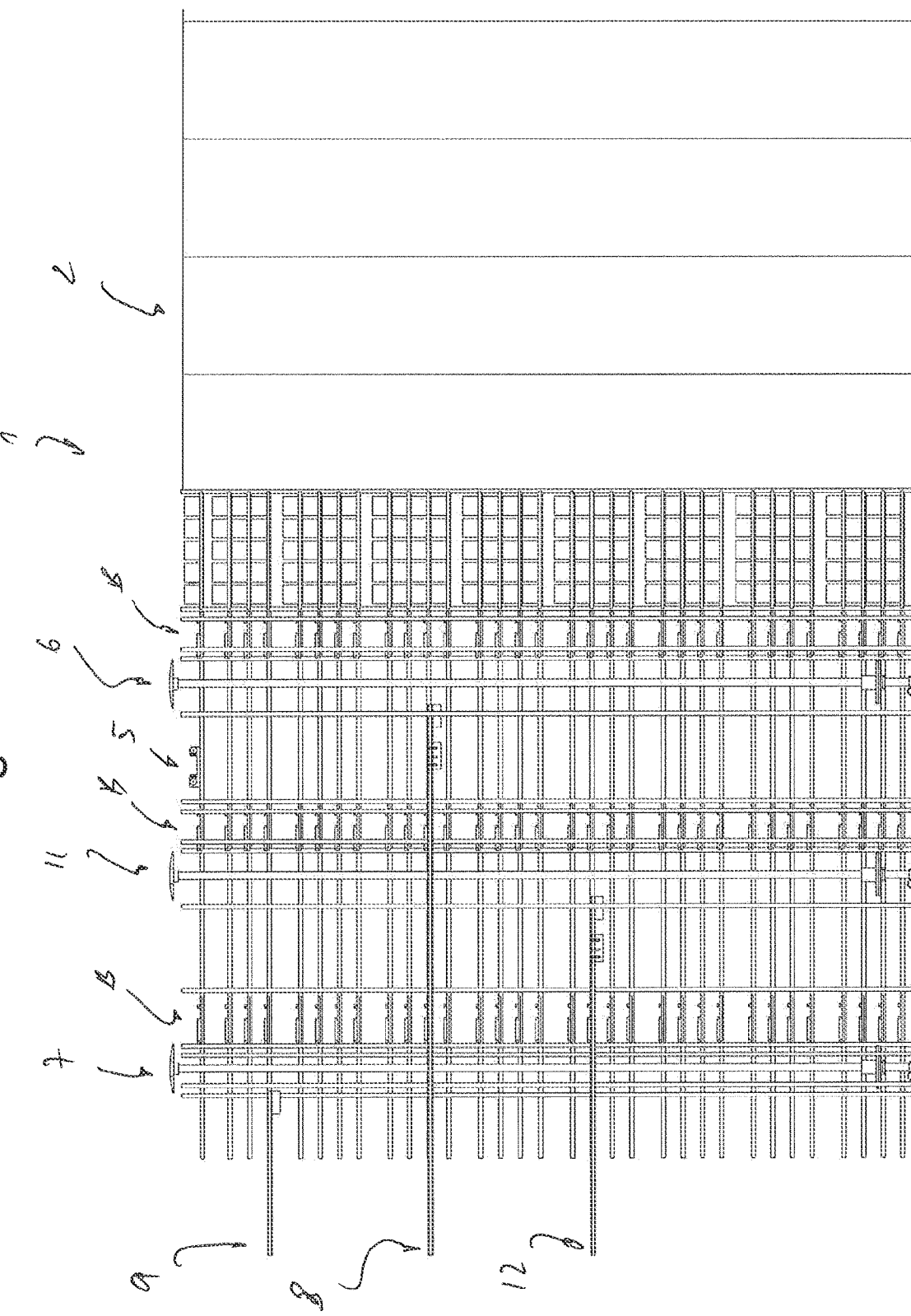
FIG. 6 shows a side view on the embodiment of FIG. 5.

In the embodiment of FIGS. 5 and 6 a further load lifting device 11 has been added as an additional outbound connection. It is arranged between load lifting device 6 and 7, which have just been virtually moved apart to create space but otherwise remain the same. As conveyor 12 is connected to the load lifting device 11 on the side opposite the load lifting device 6, the conveyor 8 needs to circumvent only the third load lifting device 11 using RAT's 10 (see FIG. 5).

In the embodiments of FIGS. 1 to 6, the space adjacent to the aisle 3 opposite the load lifting devices 6, 7 and possibly 11, was not indicated as being used. In the embodiment shown in FIG. 7 this has been changed in that the configuration of FIGS. 5 and 6 has been augmented by a fourth load lifting device 13 with a buffer B and straight conveyor 14 connecting to the device. So the load lifting devices 6, 7, 11 and 13 have separate conveyors 8, 9, 12 and 14 on different levels. Conveyors 8, 9, 12 are on one side of aisle 3 and separate straight conveyor 14 is on the opposite side of aisle 3 (and could also be arranged at the same level as one of the other connecting conveyors). Conveyors 9 and 14 are inbound and conveyors 8 and 12 are outbound. The corresponding load lifting devices have like functionality.

Figure 8:
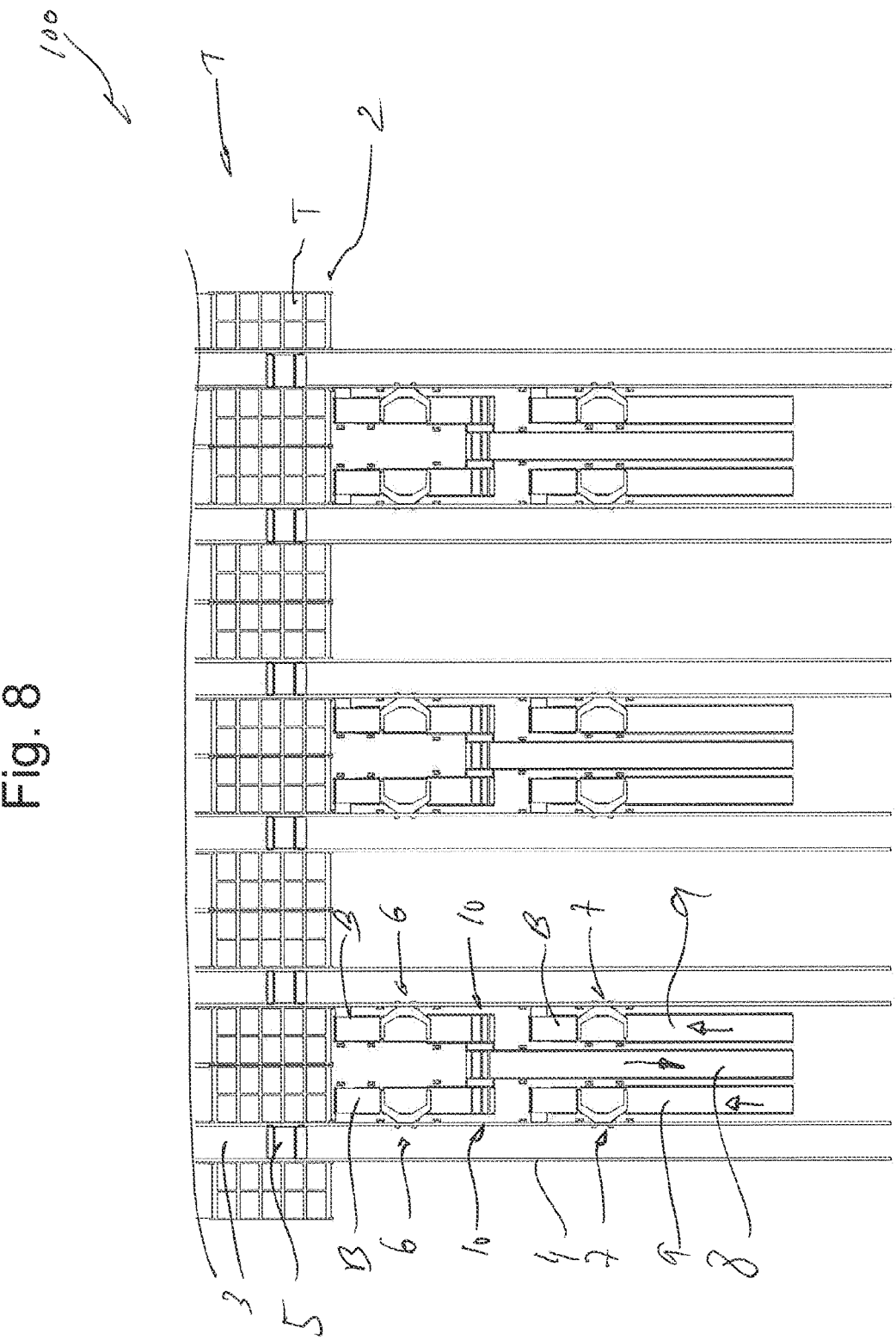
FIG. 8 shows a top view of a fifth embodiment of a storage having two load lifting devices with separate conveyors on one side of an aisle wherein the lifting devices closest to the rack of neighboring aisles share a circumventing conveyor.
Figure 9:
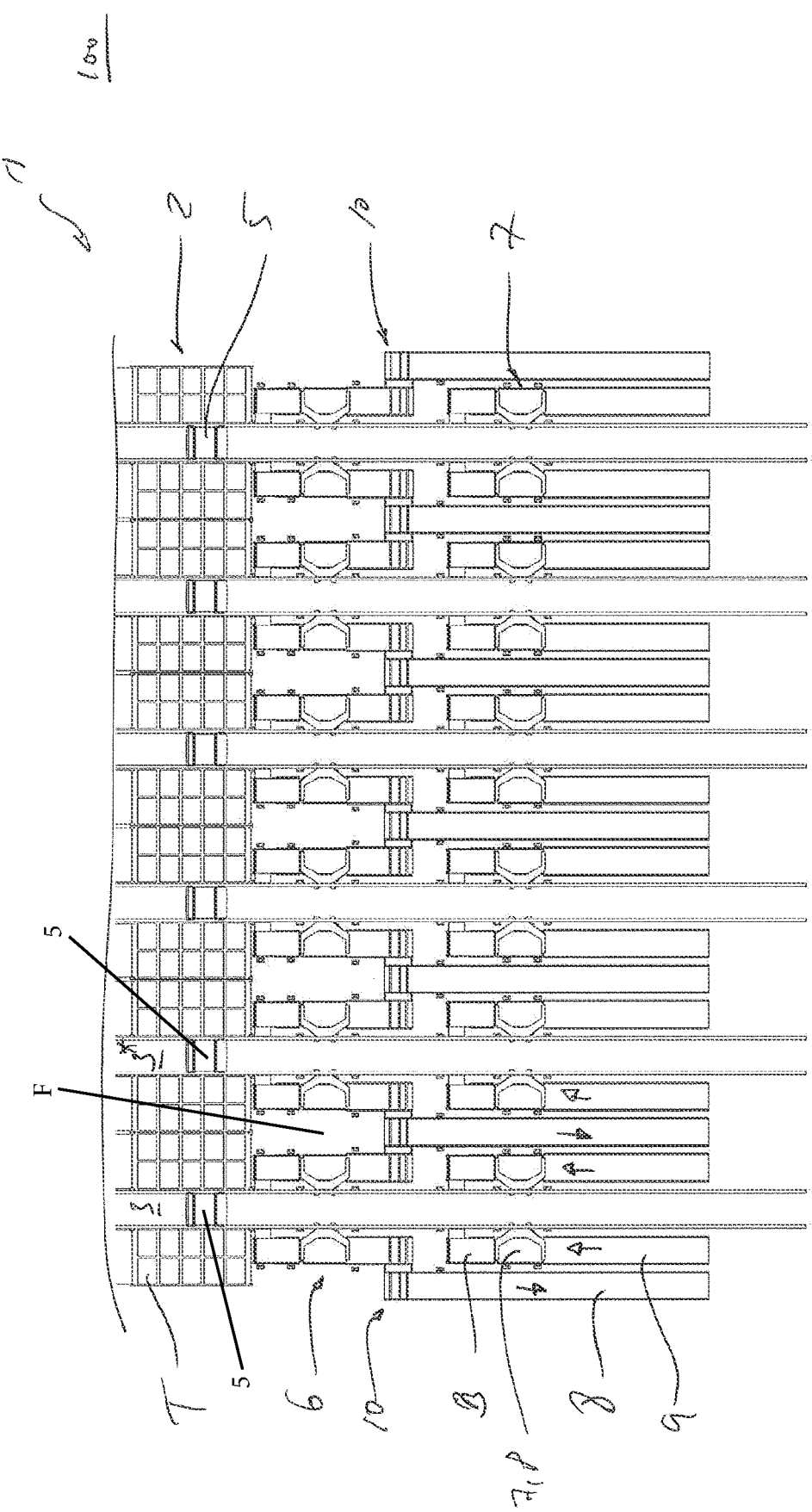
FIG. 9 shows a top view of a sixth embodiment of a storage having two load lifting devices with separate conveyors on both sides of each aisle wherein the lifting devices closest to the rack of neighboring aisles share a circumventing conveyor.
Figure 10:
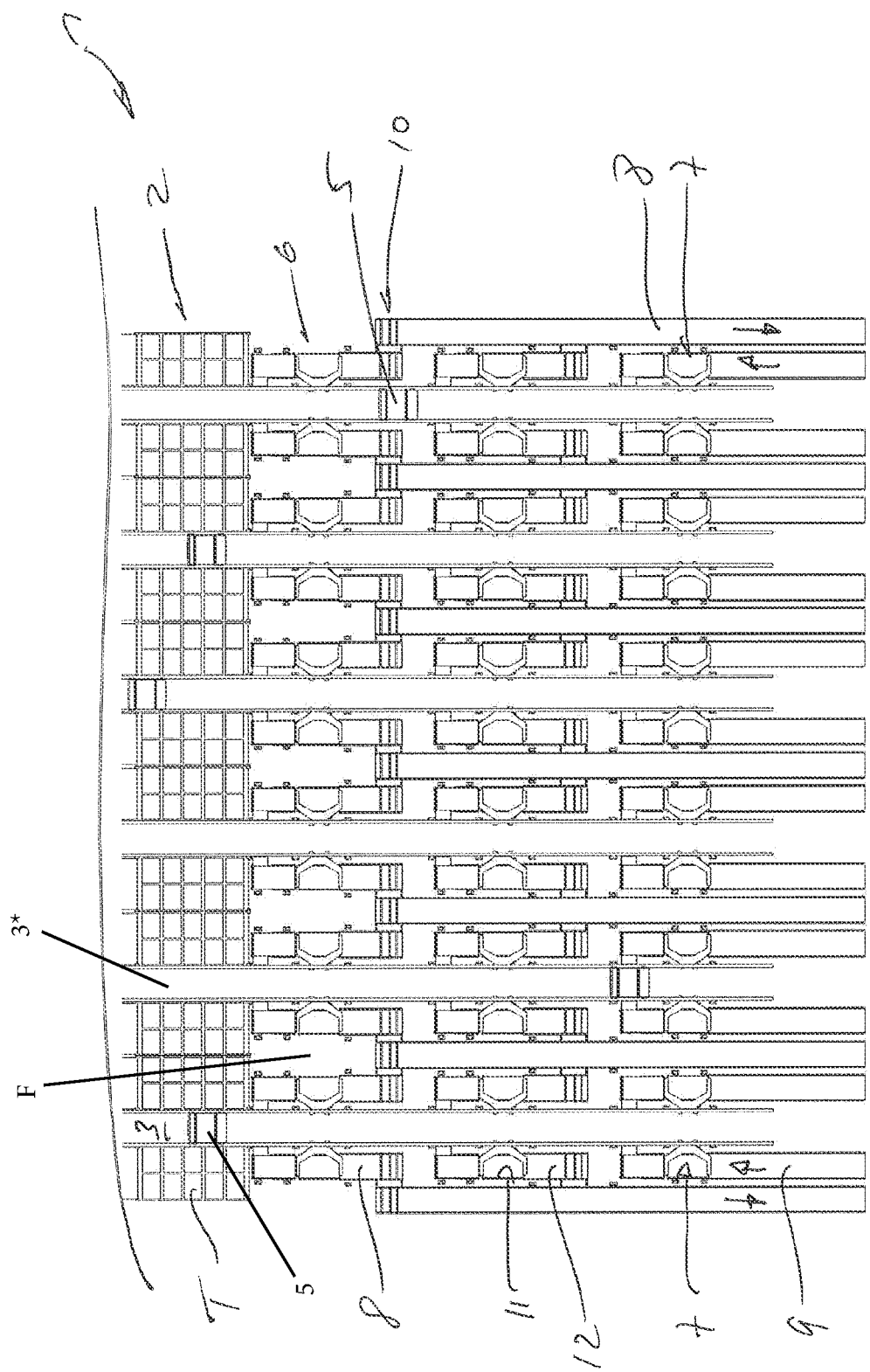
FIG. 10 shows a top view of a seventh embodiment of a storage having three load lifting devices with separate conveyors in analogy to FIG. 9.
Figure 11:
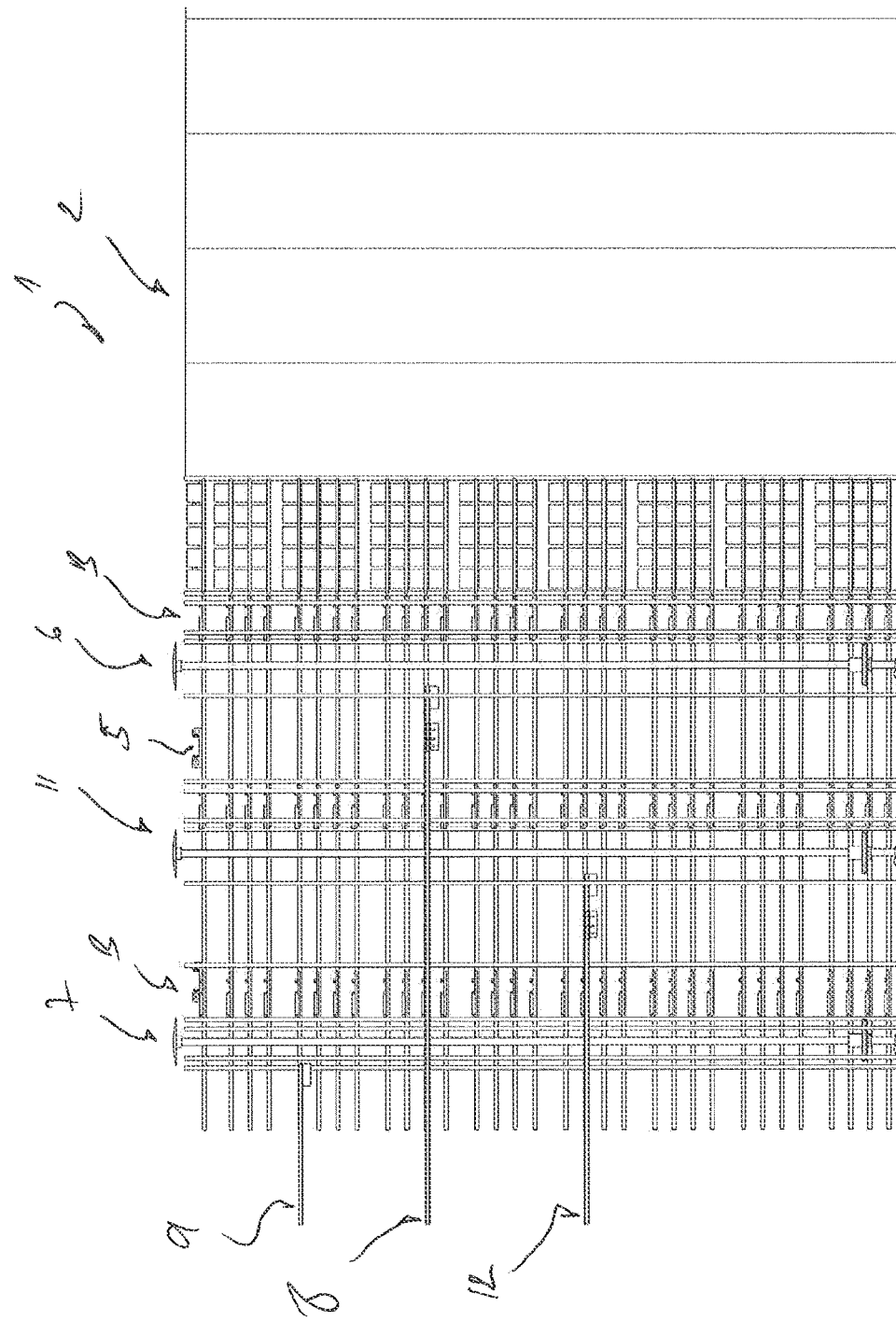
FIG. 11 shows a side view on the embodiment of FIG. 10.

FIGS. 8 to 11 detail various versions of similar embodiments. FIG. 8 shows a top view of a fifth embodiment of storage 1 having two load lifting devices 6, 7 with separate conveyors 8, 9 on one side of aisle 3 wherein the lifting devices 6 closest to the storage rack 2 of neighboring aisles 3, 3* share a circumventing conveyor 8, which uses the free space F between conveyors 9 of the adjacent aisles 3, 3*. FIG. 9 shows a top view of a sixth embodiment of storage 1 which is a slight variation of FIG. 8 in that both sides of each aisle are used in the fashion shown in analogy to FIG. 8. FIGS. 10 and 11 detail a seventh embodiment of a storage having three load lifting devices with separate conveyors in analogy to FIGS. 9 and 5.

Figure 7:
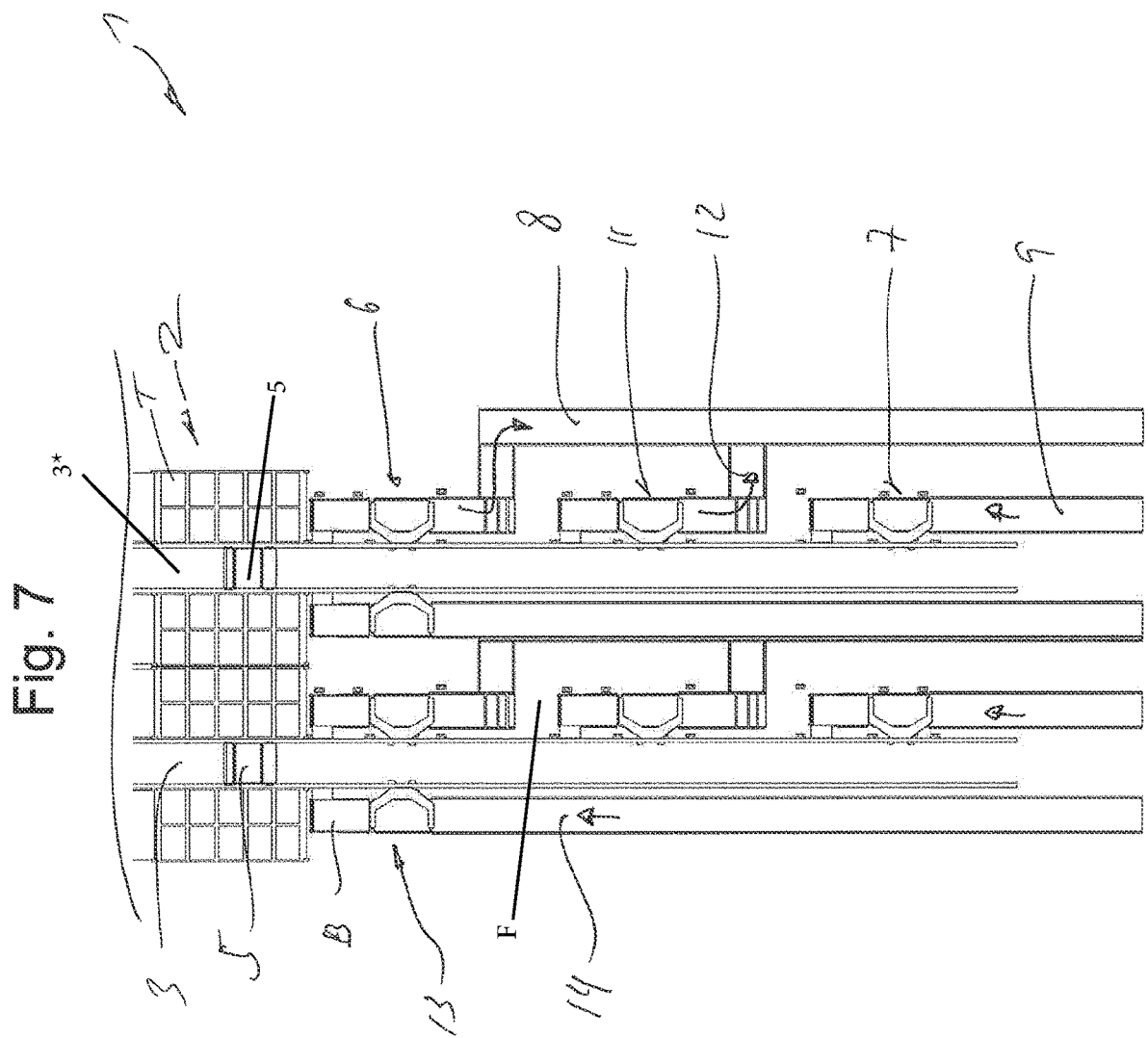
FIG. 7 shows a top view of a fourth embodiment of a storage having three load lifting devices with separate conveyors on different levels on one side of an aisle and a further load lifting device on the other side of the aisle with a separate straight conveyor.
Figure 12:
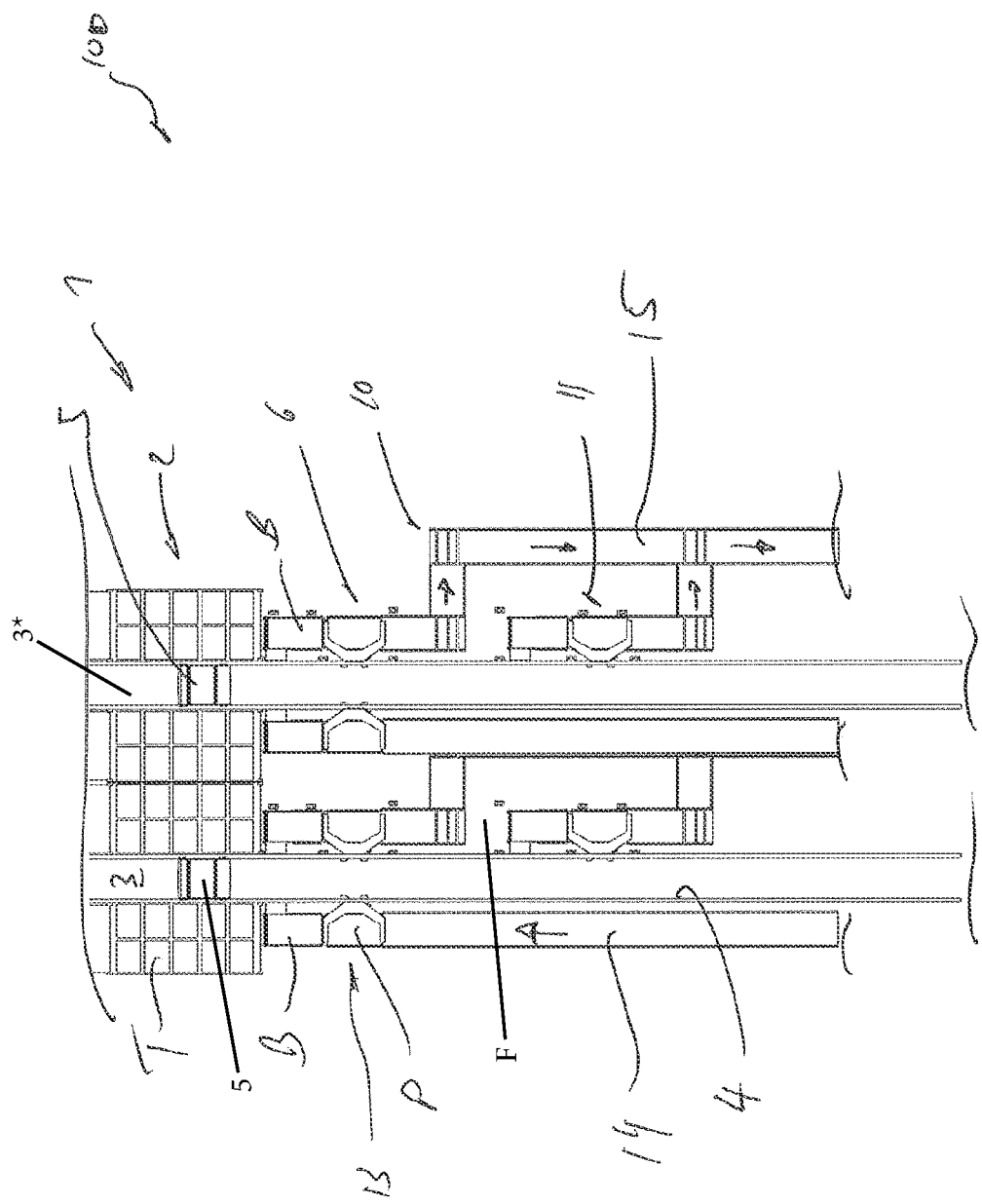
FIG. 12 shows a top view of a seventh embodiment of a storage having two load lifting devices with a shared conveyor on the same level and a further load lifting device on the other side of the aisle with a separate straight conveyor as in FIG. 7.

FIG. 12 details another embodiment of storage 1 with the difference to the embodiments of FIG. 7 in that the two outbound load lifting devices 6, 11 have a shared conveyor 15 on the same level. Inbound load lifting device 7 has been left away in view of load lifting device 13 on the other side of the aisle.

Figure 13:
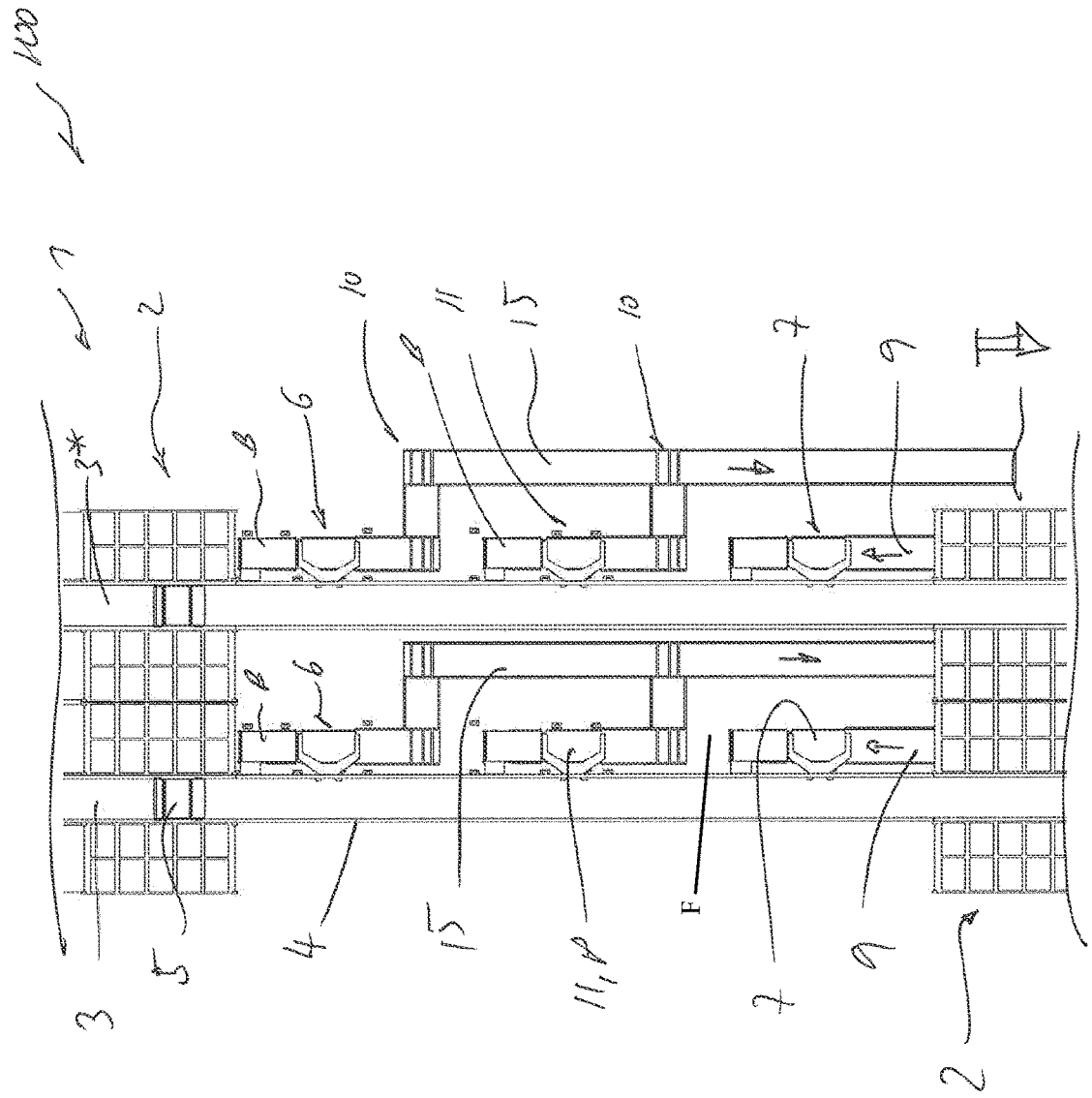
FIG. 13 shows a top view in analogy to FIG. 5 integrated into a storage rack.

FIGS. 13 to 16 show embodiments that are integrated into the storage rack 2. In FIG. 13, with analogy to FIGS. 5 and 12, the load lifting devices 6 and 7 as well as 11 are integrated into a storage rack 2, as indicated by being located between two halves of the storage rack 2. As in FIG. 12, the load lifting devices 6 and 11 have a shared conveyor 15 and load lifting device 7 has a separate conveyor 9. Both conveyors 9 and 15 use an empty level (see FIG. 16) in the rack to exit the storage or bridge to a front end of the storage 1, as indicated by the arrow.

Figure 14:
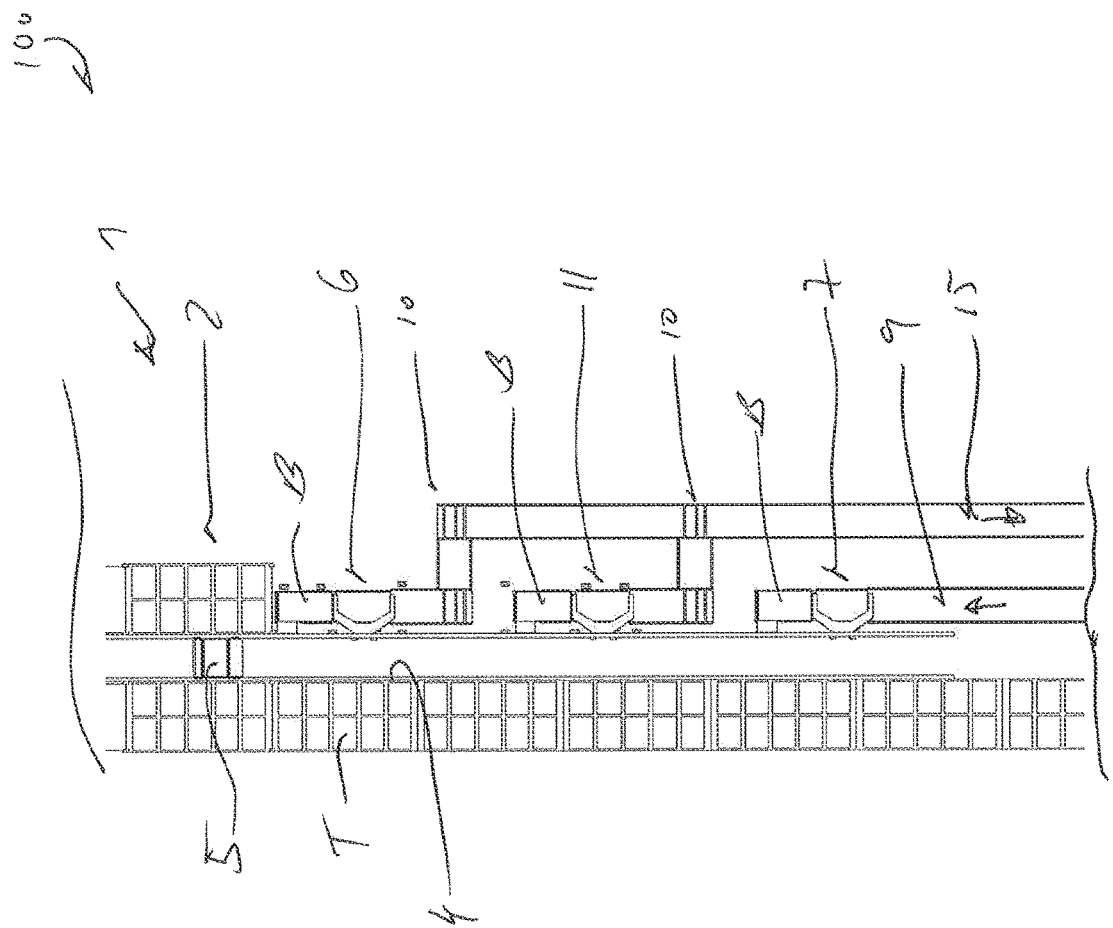
FIG. 14 shows a top view of a variation to FIG. 13 with storage locations on the opposite side of the load lifting devices.
Figure 15:
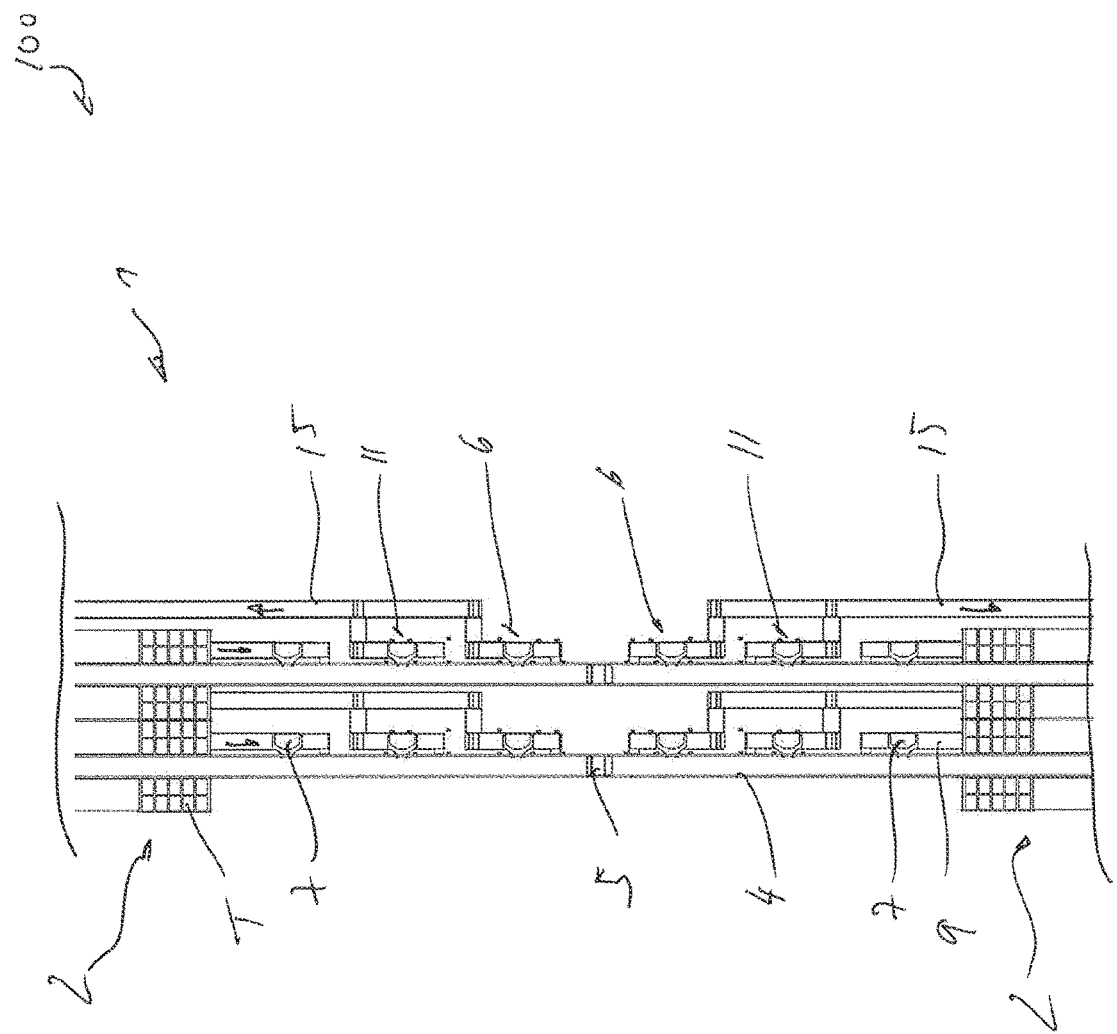
FIG. 15 shows a top view of a variation to FIG. 13 having a duplicate set of load lifting devices between storage rack part and conveyors bridging to the front end of the rack running in an empty rack level.
Figure 16:
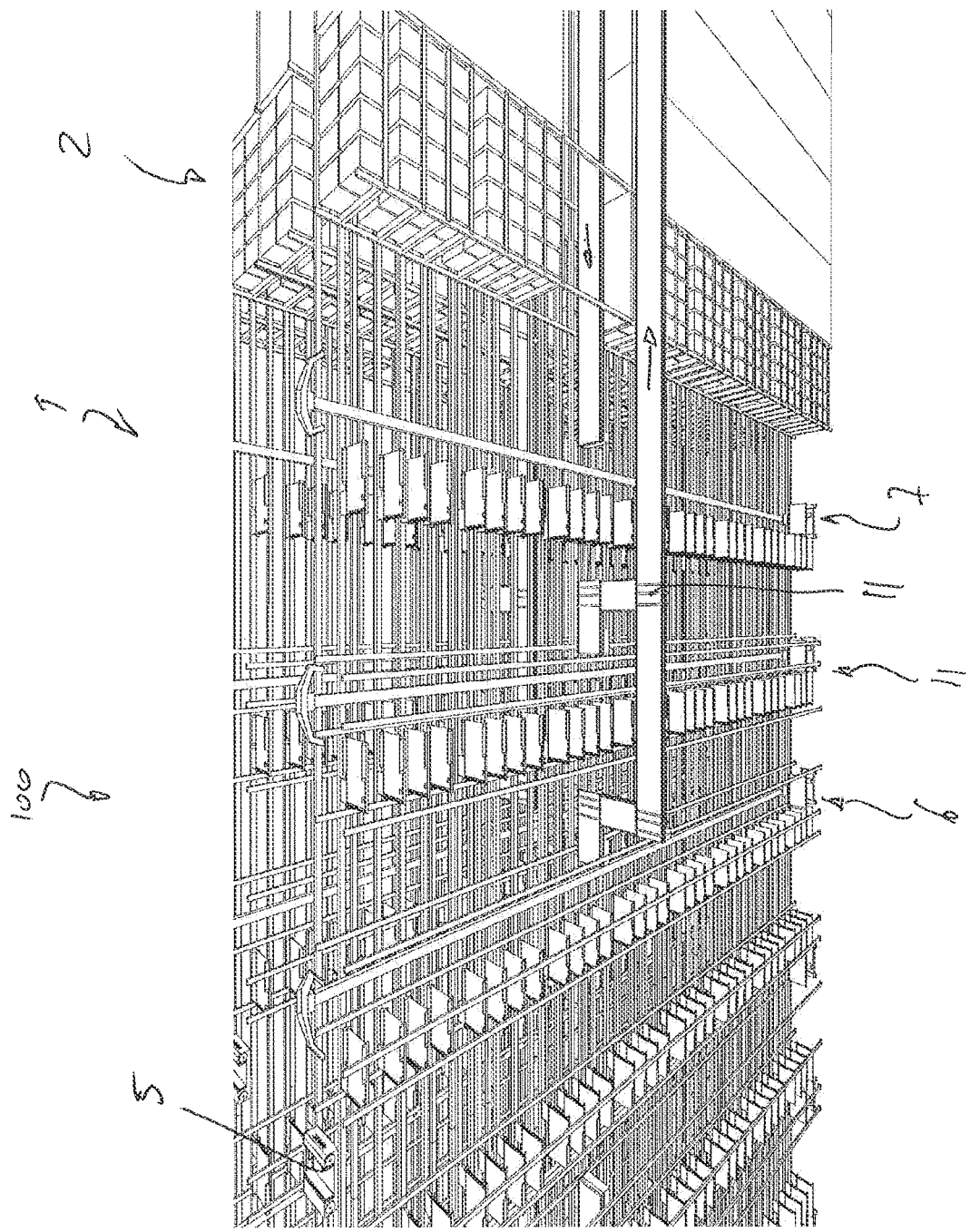
FIG. 16 shows a perspective side view of a part of FIG. 15.

The embodiment of FIG. 14 is a variation to FIG. 13 with storage locations on the opposite side of the load lifting devices 6, 7 and 11, so that space on the opposite side of the aisle 3 is used. The embodiment of FIG. 15 is a variation to FIG. 13 having a duplicate set of load lifting devices 6, 7, 11 between storage rack parts 2 and conveyors 9, 15 bridging to front end of the rack 1 running in an empty rack level as best seen in FIG. 16.

Figure 17:
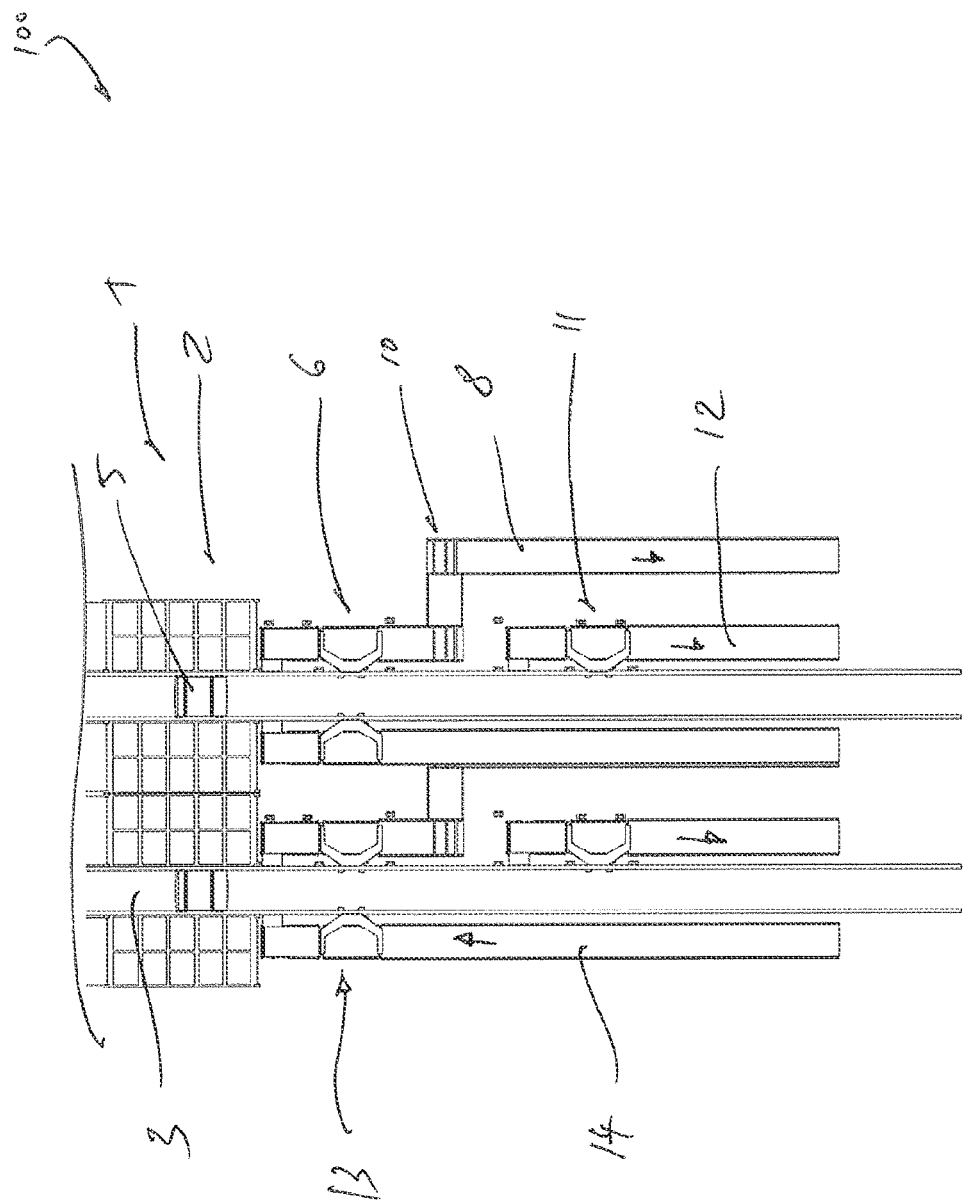
FIG. 17 shows a variation of FIG. 7.

FIG. 17 depicts a variation of the embodiment of FIG. 7 in that the configuration has changed by doing away with inbound load lifting device 7, so that now conveyor 12 of outbound load lifting device 11 may be straight.

FIG. 18 depicts a variation of the embodiment of FIG. 2 in analogy to FIG. 12 in that the configuration has been augmented by a third load lifting device 13 with a buffer B and straight conveyor 14 connecting to the device on the other side of the aisle 3 as an inbound device. Both outbound load lifting devices 6 and 11 have a shared conveyor 15. In contrast to FIG. 12, both load lifting devices 6, 11 have a connection to conveyor 15 facing each other, so that less RAT's 10 are needed when merging onto a single circumventing conveyor while being at the end of aisle.

Other changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A rack storage system, comprising
   a storage with at least two multi-level longitudinally extending storage racks that are laterally separated by an aisle;
   at least two load lifting devices each having a liftable and lowerable transport platform for lifting or lowering storage units;
   guide tracks running in at least some of the rack levels along the rack length of the aisle such that one or more storage and retrieval vehicles are displaceable along the guide tracks for transporting the storage units between the storage racks and the load lifting devices in the corresponding rack levels;
   said guide tracks being arranged in each such level in a way that the storage and retrieval vehicles may fully access the storage racks and each load lifting device by arranging the guide tracks to extend along the aisle and past the load lifting devices; and
   at least one conveyor for transporting storage units to and from said load lifting devices;
   wherein the at least two load lifting devices are arranged in a row with respect to each other in a longitudinal direction of a selected storage rack either (i) within the selected storage rack itself or (ii) longitudinally extending from a front end of the selected storage rack;
   wherein in each case at least one load lifting device is circumvented by one of the at least one conveyors using a free space defined by guide tracks of the aisle and guide tracks of an adjacent aisle to provide a conveyor connection to at least one other load lifting device from a side relative to the longitudinal direction of the row of the at least two load lifting devices, and wherein the circumvented at least one load lifting device prohibits a straight conveyor connection by the one of the at least one conveyors with the at least one other load lifting device at that level.

2. The rack storage system according to claim 1, wherein the at least two load lifting devices are connected to the same conveyor.

3. The rack storage system according to claim 1, wherein the at least two load lifting devices are connected to separate conveyors and the separate conveyors are arranged on the same or different levels.

4. The rack storage system according to claim 1, wherein a further load lifting device having a liftable and lowerable transport platform for lifting or lowering storage units is arranged at an opposite side of the aisle of the storage rack from said at least two load lifting devices either within the storage rack itself or longitudinally extending from the front end of the storage rack, and wherein the further load lifting device is connected to a separate conveyor.

5. The rack storage system according to claim 1, further comprising at least two additional load lifting devices disposed at the guide tracks of the adjacent aisle, and wherein the at least two additional load lifting devices share the same conveyor.

6. The rack storage system according to claim 5, wherein at least two load lifting devices are present on both sides of each aisle.

7. The rack storage system according to claim 1, wherein buffer conveyors are arranged on one side or both sides of at least one of the load lifting devices in at least some rack levels in which guide tracks are present.

8. The rack storage system according to claim 7, wherein buffer conveyors of corresponding load lifting devices of neighboring aisles or of corresponding load lifting devices used for a same transport direction are arranged on alternating levels.

9. The rack storage system according to claim 1, wherein the at least two load lifting devices are present on the same side of the aisle and are for either storage/infeed and/or discharge/outfeed transport direction purposes.

10. The rack storage system according to claim 1, wherein at least one conveyor has an integrated article rearrangement path with a vertically extendable pin for rearranging storage units from a longitudinal aligned conveying to a sideways aligned conveying by contacting a leading-edge while being conveyed.

11. The rack storage system according to claim 1, wherein storage locations are arranged on the side of the aisle opposite to the at least two load lifting devices.

12. The rack storage system according to claim 1, wherein the at least two load lifting devices are arranged longitudinally extending from the front end of the selected storage rack, and wherein said rack storage further comprises at least two additional load lifting devices arranged in a row with respect to each other in a longitudinal direction of the selected storage rack and longitudinally extending from an opposite end of the selected storage rack, and wherein the load lifting devices nearest to the storage rack are connected by a conveyor running in an empty rack level.

13. A rack storage system, comprising
a storage with at least two multi-level longitudinally extending storage racks that are laterally separated by an aisle;
at least two load lifting devices each having a liftable and lowerable transport platform for lifting or lowering storage units;
guide tracks running in at least some of the rack levels along the rack length of the aisle such that one or more storage and retrieval vehicles are displaceable along the guide tracks for transporting the storage units between the storage racks and the load lifting devices in the corresponding rack levels;
said guide tracks being arranged in each such level in a way that the storage and retrieval vehicles may fully access the storage racks and each load lifting device by arranging the guide tracks to extend along the aisle and past the load lifting devices; and
at least one conveyor for transporting storage units to and from said load lifting devices;
wherein the at least two load lifting devices are arranged in a row with respect to each other in a longitudinal direction of a selected storage rack either (i) within the selected storage rack itself or (ii) longitudinally extending from a front end of the selected storage rack;
wherein in each case at least one load lifting device is circumvented by one of the at least one conveyors using a free space defined by guide tracks of the aisle and guide tracks of an adjacent aisle to provide a conveyor connection to at least one other load lifting device from a side relative to the longitudinal direction of the row of the at least two load lifting devices, and wherein the circumvented at least one load lifting device prohibits a straight conveyor connection by the one of the at least one conveyors with the at least one other load lifting device at that level;
wherein the at least two load lifting devices are connected to the same conveyor; and
wherein a further load lifting device having a liftable and lowerable transport platform for lifting or lowering storage units is arranged at an opposite side of the aisle of the storage rack from said at least two load lifting devices either within the storage rack itself or longitudinally extending from the front end of the storage rack, and wherein the further load lifting device is connected to a separate conveyor.

14. The rack storage system according to claim 13, further comprising at least two additional load lifting devices disposed at the guide tracks of the adjacent aisle, and wherein the at least two additional load lifting devices share the same conveyor.

15. The rack storage system according to claim 13, wherein buffer conveyors are arranged on one side or both sides of at least one of the load lifting devices in at least some rack levels in which guide tracks are present.

16. The rack storage system according to claim 13, wherein the at least two load lifting devices are present on the same side of the aisle and are for either storage/infeed and/or discharge/outfeed transport direction purposes.

17. A rack storage system, comprising
a storage with at least two multi-level longitudinally extending storage racks that are laterally separated by an aisle;
at least two load lifting devices each having a liftable and lowerable transport platform for lifting or lowering storage units;
guide tracks running in at least some of the rack levels along the rack length of the aisle such that one or more storage and retrieval vehicles are displaceable along the guide tracks for transporting the storage units between the storage racks and the load lifting devices in the corresponding rack levels;
said guide tracks being arranged in each such level in a way that the storage and retrieval vehicles may fully access the storage racks and each load lifting device by arranging the guide tracks to extend along the aisle and past the load lifting devices; and
at least one conveyor for transporting storage units to and from said load lifting devices;
wherein the at least two load lifting devices are arranged in a row with respect to each other in a longitudinal direction of a selected storage rack either (i) within the selected storage rack itself or (ii) longitudinally extending from a front end of the selected storage rack;
wherein in each case at least one load lifting device is circumvented by one of the at least one conveyors using a free space defined by guide tracks of the aisle and guide tracks of an adjacent aisle to provide a conveyor connection to at least one other load lifting device from a side relative to the longitudinal direction of the row of the at least two load lifting devices, and wherein the circumvented at least one load lifting device prohibits a straight conveyor connection by the one of the at least one conveyors with the at least one other load lifting device at that level;
wherein the at least two load lifting devices are connected to separate conveyors and the separate conveyors are arranged on the same or different levels; and
wherein a further load lifting device having a liftable and lowerable transport platform for lifting or lowering storage units is arranged at an opposite side of the aisle of the storage rack from said at least two load lifting devices either within the storage rack itself or longitudinally extending from the front end of the storage rack, and wherein the further load lifting device is connected to a separate conveyor.

18. The rack storage system according to claim 17, further comprising at least two additional load lifting devices disposed at the guide tracks of the adjacent aisle, and wherein the at least two additional load lifting devices share the same conveyor.

19. The rack storage system according to claim 17, wherein buffer conveyors are arranged on one side or both sides of at least one of the load lifting devices in at least some rack levels in which guide tracks are present.

20. The rack storage system according to claim 17, wherein the at least two load lifting devices are present on the same side of the aisle and are for either storage/infeed and/or discharge/outfeed transport direction purposes.

* * * * *

UNITED STATES PATENT AND TRADEMARK OFFICE
CERTIFICATE OF CORRECTION

PATENT NO. : 11,655,101 B2
APPLICATION NO. : 17/154857
DATED : May 23, 2023
INVENTOR(S) : Mantas Plaščinskas Page 1 of 1

It is certified that error appears in the above-identified patent and that said Letters Patent is hereby corrected as shown below:

In the Specification
Column 5
Line 51, insert --5,-- after --shuttles--

In the Claims
Column 8
Line 49, "fora" should be --for a--

Signed and Sealed this
Twenty-seventh Day of June, 2023

Katherine Kelly Vidal
*Director of the United States Patent and Trademark Office*